US012440364B2

(12) United States Patent
Poker et al.

(10) Patent No.: US 12,440,364 B2
(45) Date of Patent: *Oct. 14, 2025

(54) STERNAL PAD MOUNT FOR SPINE BRACE

(71) Applicant: DeRoyal Industries, Inc., Powell, TN (US)

(72) Inventors: Nicholas John Poker, Knoxville, TN (US); Lily Dawn Goins, Speedwell, TN (US); Dhanvin Sunil Desai, Knoxville, TN (US); John Connor Brown, Knoxville, TN (US); Charles Joseph French, III, Knoxville, TN (US); Karen M. Clements, Knoxville, TN (US); Olufunke Tina Anjonrin-Ohu, Knoxville, TN (US)

(73) Assignee: DeRoyal Industries, Inc., Powell, TN (US)

( * ) Notice: Subject to any disclaimer, the term of this patent is extended or adjusted under 35 U.S.C. 154(b) by 331 days.

This patent is subject to a terminal disclaimer.

(21) Appl. No.: 17/899,726

(22) Filed: Aug. 31, 2022

(65) Prior Publication Data

US 2023/0000658 A1    Jan. 5, 2023

Related U.S. Application Data

(63) Continuation-in-part of application No. 17/841,855, filed on Jun. 16, 2022, now Pat. No. 11,752,025, (Continued)

(51) Int. Cl.
*A61F 5/02* (2006.01)

(52) U.S. Cl.
CPC .............. *A61F 5/022* (2013.01); *A61F 5/028* (2013.01)

(58) Field of Classification Search
CPC ........ A61F 5/02–028; A61H 2201/165; A61H 2003/007; A61H 2201/0192;
(Continued)

(56) References Cited

U.S. PATENT DOCUMENTS

| 6,478,759 | B1 | 11/2002 | Modglin et al. |
| 10,368,626 | B2 | 8/2019 | Roque et al. |

(Continued)

FOREIGN PATENT DOCUMENTS

| JP | H1156525 A | * | 3/1999 | ............... A47C 7/54 |
| WO | WO-2018218228 A1 | * | 11/2018 | ........... A61H 1/0244 |

OTHER PUBLICATIONS

Translation of JP-H1156525-A (Year: 1999).*
Kun-Ku Oh, Office of the United Arab Emirates Ministry of Economy, Search Report, Application No. P6002135 / 2021, Jul. 18, 2024, Abu, Dhabi.

*Primary Examiner* — Rachael E Bredefeld
*Assistant Examiner* — Seth R. Brown
(74) *Attorney, Agent, or Firm* — Luedeka Neely, P.C.

(57) ABSTRACT

The disclosure provides a brace having a brace panel; a pad having an adjustment post with adjustment apertures; and an adjustable mount integrated with the panel for adjustably mounting the pad onto the panel, the adjustable mount including wedged levers operatively associated with a retaining arm having pins and located within a channel configured to receive the adjustment post of the sternal pad and the adjustment apertures.

9 Claims, 6 Drawing Sheets

Related U.S. Application Data which is a continuation of application No. 17/304,256, filed on Jun. 17, 2021, now Pat. No. 11,771,580.

(60) Provisional application No. 63/118,070, filed on Nov. 25, 2020.

(58) Field of Classification Search
CPC ...... A61H 2201/164; A61H 2201/1645; A61H 1/0244; A61H 1/0292; A47C 7/402; A47C 7/46; A47C 7/462; A45F 3/08; A45F 3/14; B60N 2/77; B60N 2/812; B60N 2/815
USPC ...................................... 602/19; 248/59, 593
See application file for complete search history.

(56) References Cited

U.S. PATENT DOCUMENTS

| | | |
|---|---|---|
| D894,042 S | 8/2020 | Paik et al. |
| 2008/0303296 A1* | 12/2008 | Waltz .................... E01H 1/1206 294/1.4 |
| 2011/0105971 A1 | 5/2011 | Ingimundarson et al. |
| 2011/0298263 A1* | 12/2011 | Bateman ................ A47C 7/402 29/428 |
| 2013/0184625 A1 | 7/2013 | Ingimundarson et al. |
| 2014/0100501 A1* | 4/2014 | Burke .................... A61F 5/026 602/19 |
| 2019/0070033 A1* | 3/2019 | Heronen ................ A61F 5/022 |
| 2020/0093629 A1* | 3/2020 | Marko .................... A61F 5/00 |

* cited by examiner

STERNAL PAD MOUNT FOR SPINE BRACE

FIELD

The present disclosure relates to braces for the spine. More particularly, the disclosure relates to an improved sternal pad mount for spine braces.

BACKGROUND

Improvement is desired in the design of braces for the spine. The present disclosure provides an improved sternal pad mount for spine braces.

SUMMARY

The disclosure advantageously provides an adjustable mount structure that is particularly configured for adjustably mounting a sternal pad on a spine brace In one aspect, a brace according to the disclosure includes a brace panel; a pad having an adjustment post with adjustment apertures; and an adjustable mount integrated with the panel for adjustably mounting the pad onto the panel, the adjustable mount including wedged levers operatively associated with a retaining arm having pins and located within a channel configured to receive the adjustment post of the sternal pad and the adjustment apertures.

In another aspect, a brace according to the disclosure includes a brace panel; a pad having an adjustment post; and an adjustable mount integrated with the brace panel for adjustably mounting the pad onto the brace panel, the adjustable mount including wedged levers operatively associated with a retaining arm and located within a channel configured to receive the adjustment post of the pad.

In a further aspect, the disclosure provides a height adjustment system including an adjustment post with adjustment apertures; and an adjustable mount having wedged levers operatively associated with a retaining arm having pins and located within a channel into which the adjustment post is received. Thee adjustment apertures are engaged by the pins of the retaining arm to lock the adjustment post in position and the adjustment post is adjustably positionable relative to the adjustable mount by pinching the wedged levers to move the retaining arm and the pins of the retaining arm out of engagement with the adjustment apertures to enable adjustment of the position of the adjustment post in the adjustable mount, and the adjustment post is again locked in position by releasing the wedged levers to engage the pins of the retaining arm with the adjustment apertures.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
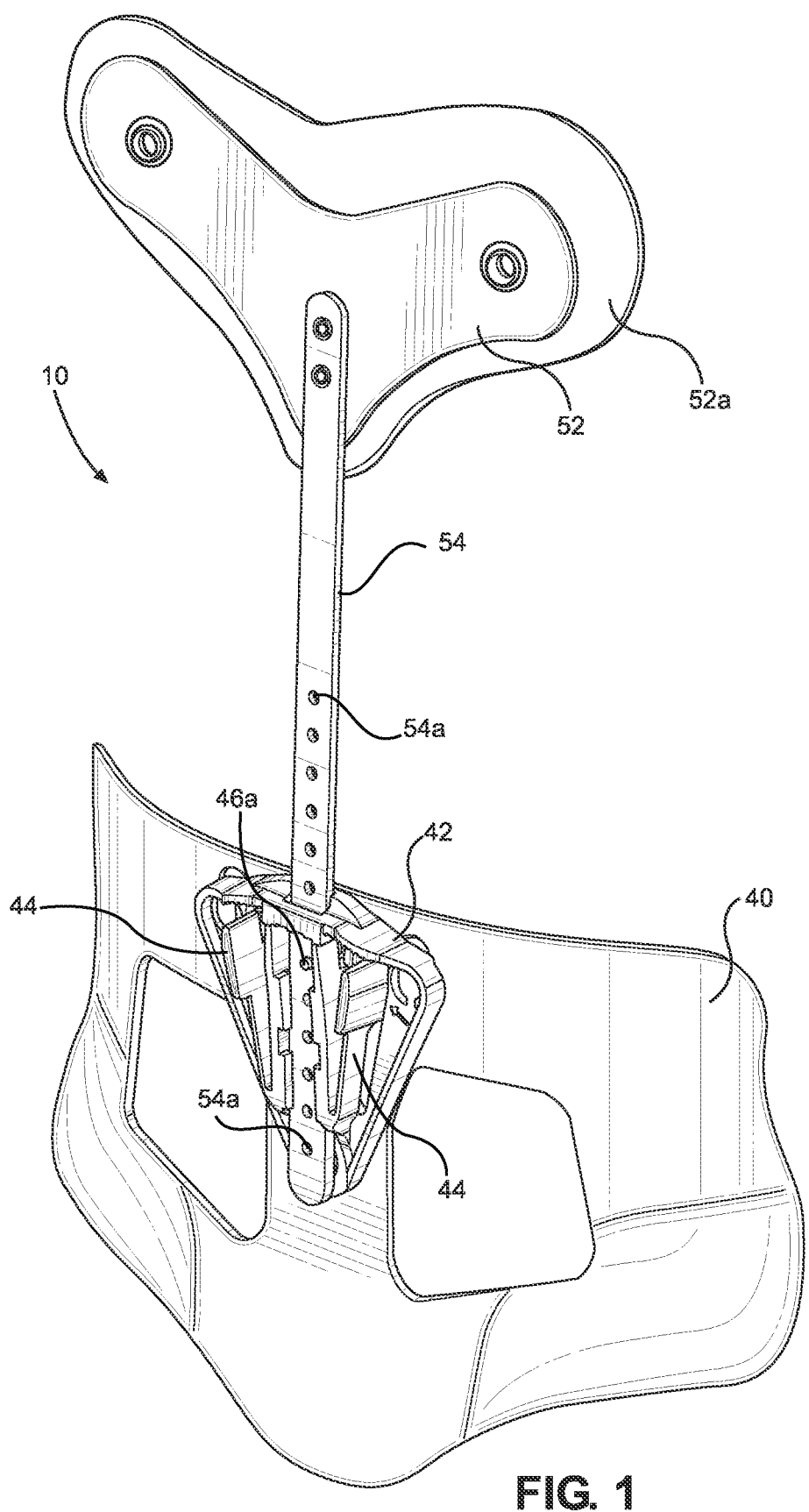
FIG. 1 is a perspective view of a spine brace with a sternal pad mount according to the disclosure for adjusting the height of a sternal pad.
Figure 2:
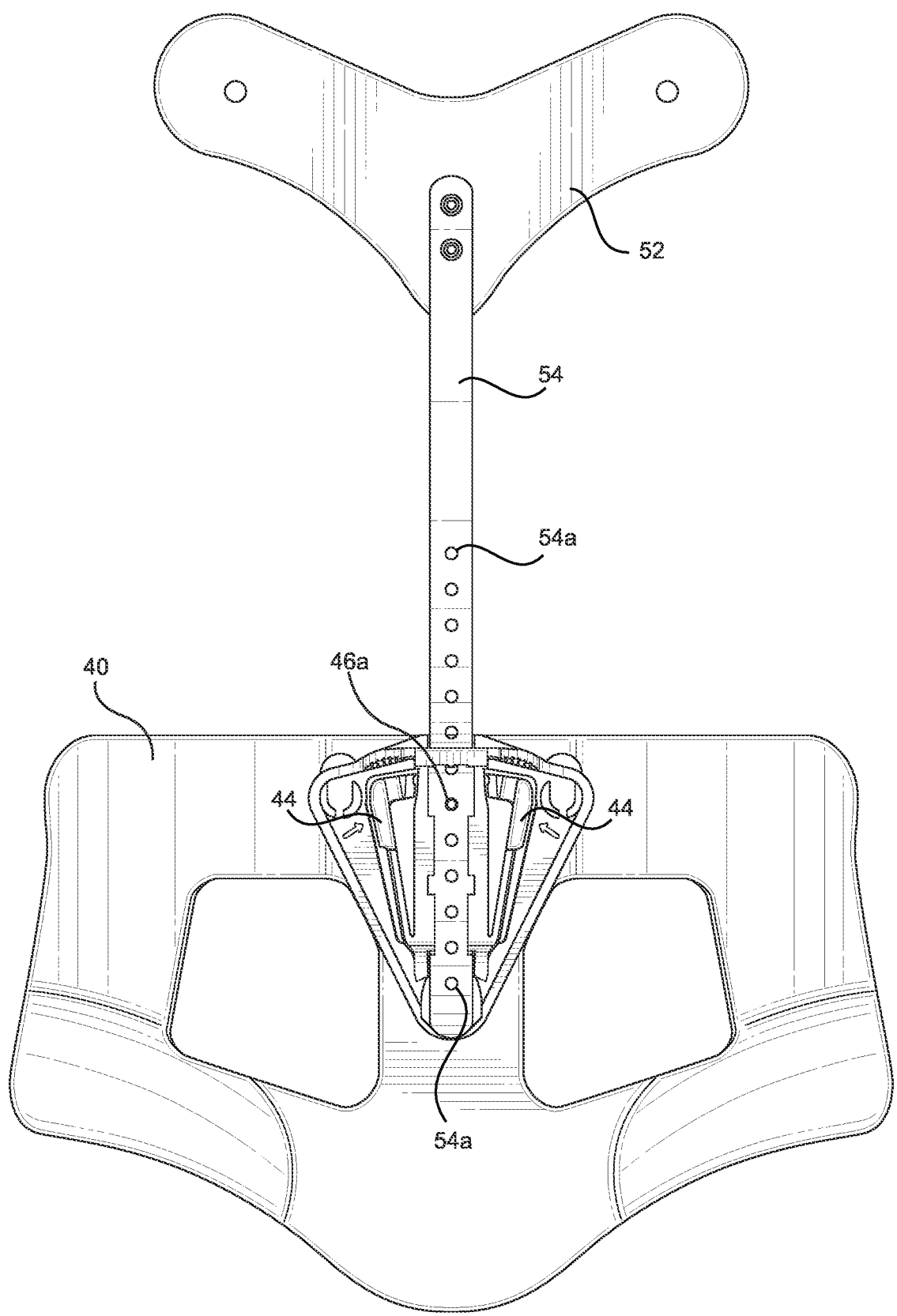
FIG. 2 is a front view of the spine brace with the sternal pad mount and sternal pad.
Figure 3:
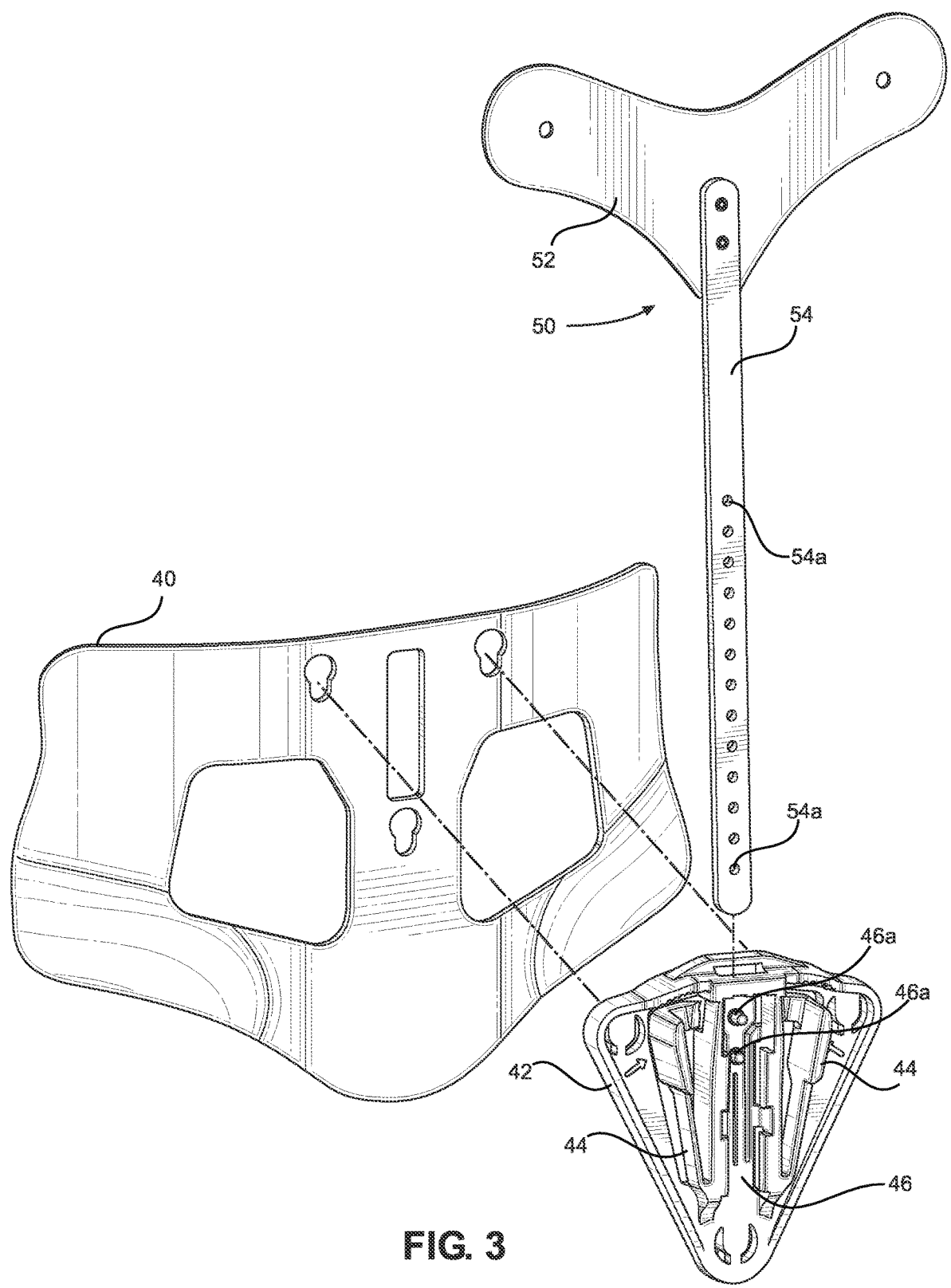
FIG. 3 shows the sternal pad mount and the sternal pad removed from the spine brace.
Figure 4:
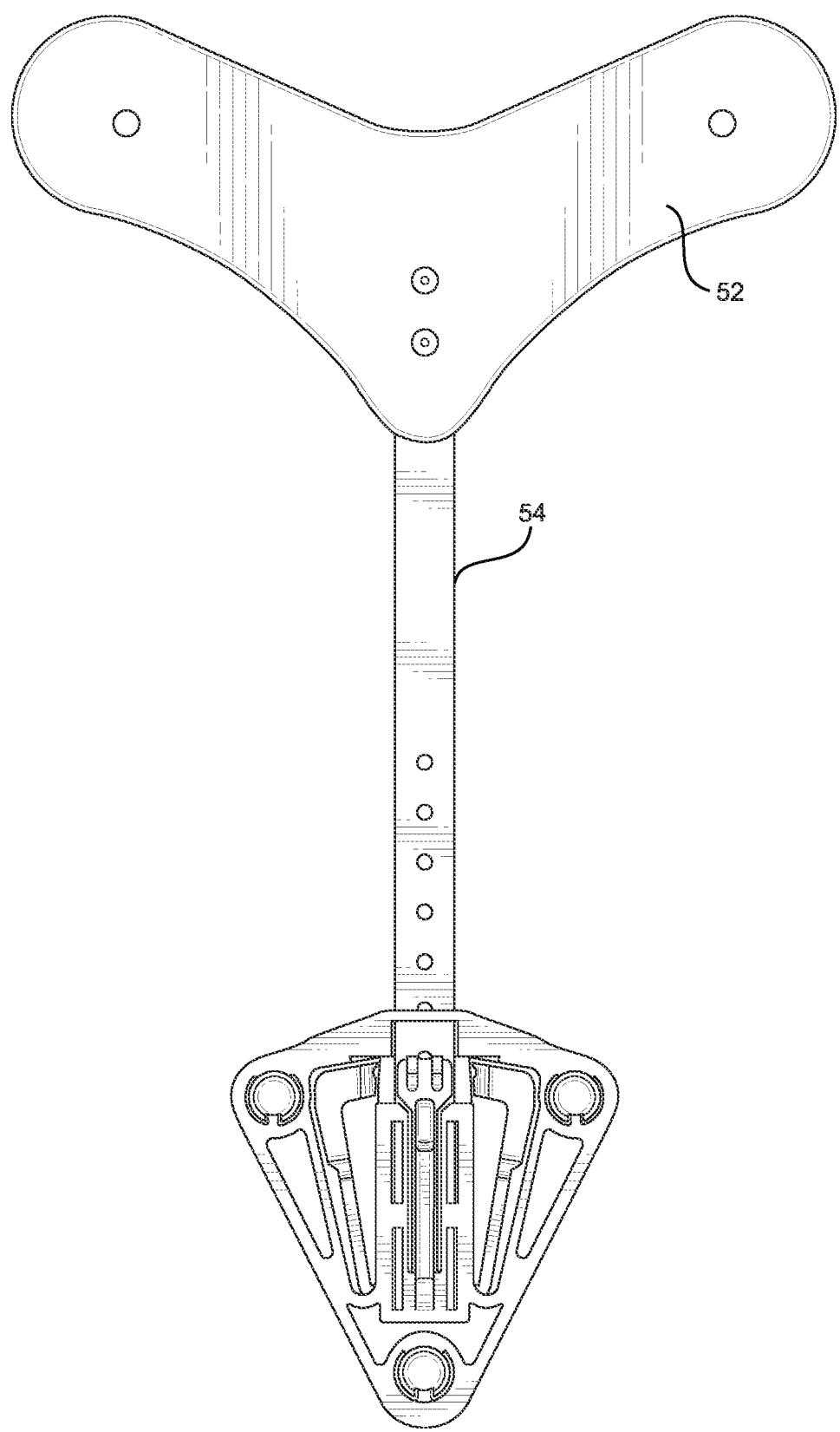
FIG. 4 is a front view of the sternal pad mount with the sternal pad installed thereon.

With reference to the drawings, the disclosure provides a spinal brace 10 having an anterior panel 40 having a sternal pad kit (SPK) 50.

The anterior panel 40 has an integrated adjustable mount 42 for adjustably mounting the sternal pad kit 50 onto the anterior panel 40. The mount 42 includes wedged levers 44 operatively associated with a retaining arm 46 having pins 46a and located within a channel 48.

Figure 5:
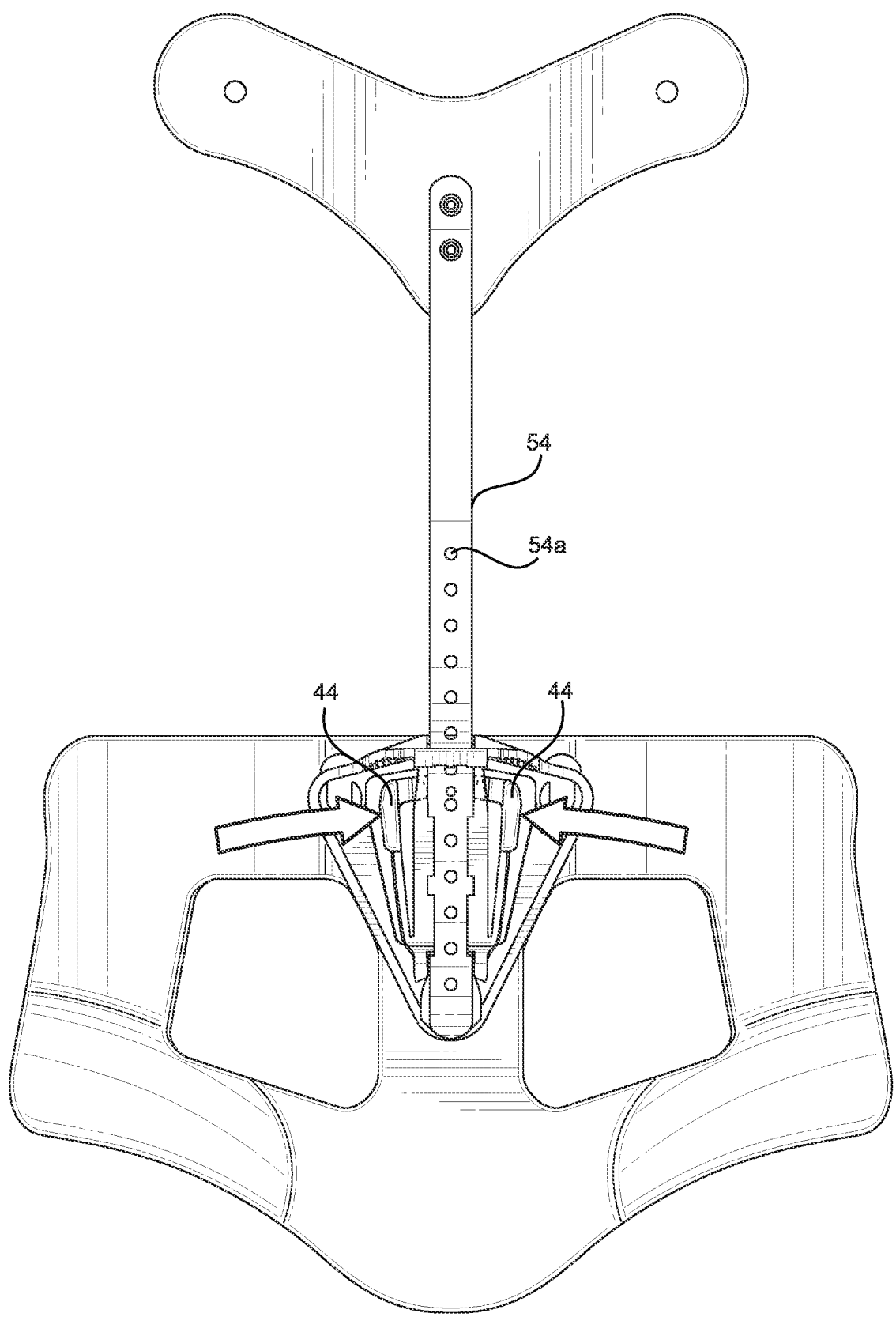
FIGS. 5 and 6 show adjustment of the height of the sternal pad.
Figure 6:
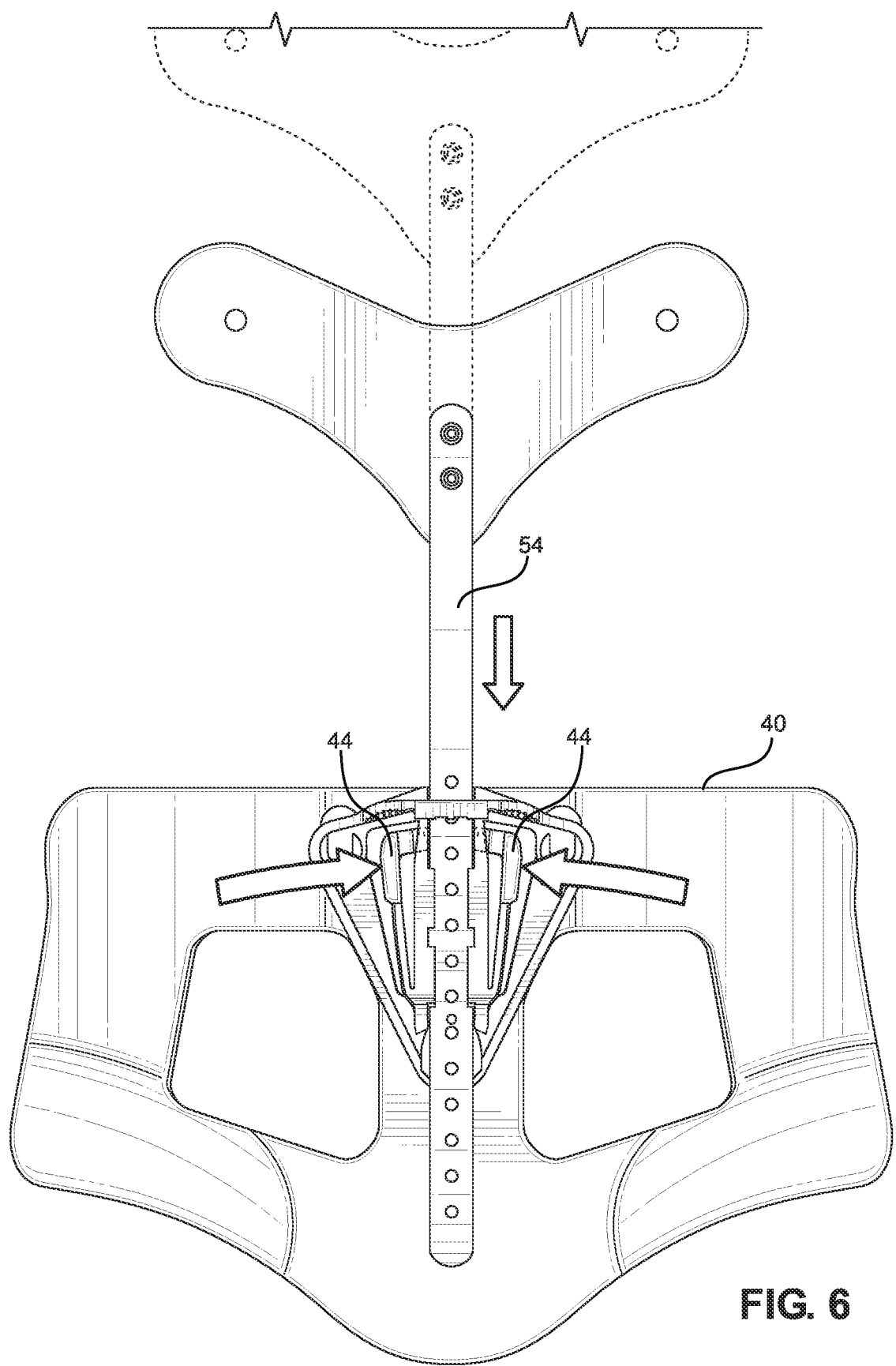

The sternal pad kit 50 has a sternal plate 52 having a pad 52a (FIG. 1) supported by an adjustment post 54 having adjustment apertures 54a. The post 54 is received in the channel 48 of the adjustable mount 42 of the anterior panel To insert and adjust the height of the sternal pad 52, as shown in FIGS. 5 and 6, a user will pinch the wedged levers 44 and this motion will move the retaining arm 46 and pins 46a out of position. An advantage of this design is that the wedged levers 44 will bottom out or run out of travel. Thus, the retaining arm 46 can only travel back so far and will not enter permanent deformation. When the levers 44 are released the pin 46a will be fully inserted through the apertures 54a, making failure less likely to occur.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated.

The invention claimed is:

1. A brace for supporting a spine of a patient, the brace comprising:
   a brace panel;
   a pad having an adjustment post with adjustment apertures; and
   an adjustable mount integrated with the panel for adjustably mounting the pad onto the panel, the adjustable mount including wedged levers operatively associated with a retaining arm having pins and located within a channel configured to receive the adjustment post of the pad and the adjustment apertures.

2. The brace of claim 1, wherein the brace is a spine brace.

3. A brace, comprising:
   a brace panel;
   a pad having an adjustment post; and
   an adjustable mount integrated with the brace panel for adjustably mounting the pad onto the brace panel, the adjustable mount including wedged levers operatively associated with a retaining arm and located within a channel configured to receive the adjustment post of the pad.

4. The brace of claim 3, wherein the adjustment post includes uniformly spaced adjustment apertures.

5. The brace of claim 4, wherein the retaining arm has uniformly spaced pins located to be received by the adjustment apertures of the adjustment post.

6. The brace of claim 3, wherein the panel is an anterior panel and the pad is a sternal pad.

7. The brace of claim 3, wherein the brace is a spine brace.

8. A height adjustment system, comprising:
an adjustment post with adjustment apertures; and
an adjustable mount having a pair of wedged levers operatively associated with a retaining arm having pins and located within a channel into which the adjustment post is received, the retaining arm extending between the pair of wedged levers,
wherein the adjustment apertures are engaged by the pins of the retaining arm to lock the adjustment post in position and the adjustment post is adjustably positionable relative to the adjustable mount by pinching the pair of wedged levers to move the retaining arm and the pins of the retaining arm out of engagement with the adjustment apertures to enable adjustment of the position of the adjustment post in the adjustable mount, and the adjustment post is again locked in position by releasing the pair of wedged levers to engage the pins of the retaining arm with the adjustment apertures.

9. A height adjustment system, comprising:
an adjustment post with adjustment apertures; and
an adjustable mount having a pair of wedged levers operatively associated with a retaining arm having pins and located within a channel into which the adjustment post is received, the adjustment post positionable to extend between the pair of wedged levers,
wherein the adjustment apertures are engaged by the pins of the retaining arm to lock the adjustment post in position and the adjustment post is adjustably positionable relative to the adjustable mount by pinching the pair of wedged levers to move the retaining arm and the pins of the retaining arm out of engagement with the adjustment apertures to enable adjustment of the position of the adjustment post in the adjustable mount, and the adjustment post is again locked in position by releasing the pair of wedged levers to engage the pins of the retaining arm with the adjustment apertures.

* * * * *